US007284628B2

(12) United States Patent
Pal

(10) Patent No.: US 7,284,628 B2
(45) Date of Patent: Oct. 23, 2007

(54) MULTIPURPOSE MOTOR VEHICLE WITH TWO COAXIAL PARALLEL WHEELS AND MORE ELECTROMAGNETIC HOLONOMIC WHEELS IN TANDEM

(76) Inventor: Anadish Kumar Pal, Anadish Kumar Pal, 194 Vaishali, Pitampura, Delhi, Delhi (IN) 110088

( * ) Notice: Subject to any disclaimer, the term of this patent is extended or adjusted under 35 U.S.C. 154(b) by 301 days.

(21) Appl. No.: 10/994,300

(22) Filed: Nov. 23, 2004

(65) Prior Publication Data
US 2005/0072616 A1 Apr. 7, 2005

Related U.S. Application Data

(63) Continuation-in-part of application No. 09/781,090, filed on Jan. 12, 2001, now Pat. No. 7,017,696.

(51) Int. Cl.
*B60K 1/02* (2006.01)
(52) U.S. Cl. ........................................ 180/65.5; 180/7.1
(58) Field of Classification Search ............... 180/65.5, 180/7.1, 6.5, 218
See application file for complete search history.

(56) References Cited

U.S. PATENT DOCUMENTS

| 3,057,426 | A  | * | 10/1962 | Hastings, Jr. ................ 180/255 |
| 7,017,696 | B2 | * | 3/2006  | Pal ............................... 180/218 |
| 2001/0042650 | A1 | * | 11/2001 | van den Berg ............. 180/218 |
| 2005/0145428 | A1 | * | 7/2005  | Chun et al. .................. 180/209 |

* cited by examiner

Primary Examiner—Tony Winner

(57) ABSTRACT

A vehicle with zero turning radius employing a minimum of two generally parallel matching annular wheels mounted with independent pneumatic toroidal suspensions fixed coaxially on a chassis. The wheels have mounted on their inner hub sides frictional linings along which run a respectively equal number of circumferentially distributed truncated-bicone-shaped rotors of brush-less dc motors with stator shafts fixed on to the axles of the wheels. Addition of a number of large holonomic wheels in tandem on either side of the two generally parallel wheels makes the vehicle longer and more stable. The large holonomic wheels have tires formed by a toroidal unanimity of disc-like rollers with magnetic or electromagnetic elements radially distributed evenly to make each disc-like roller rotate or resist rotation perpendicular to the holonomic wheel axis by acting as a rotor to motor stator windings attached to the chassis in proximity with the ground-engaging portion of the tire.

5 Claims, 7 Drawing Sheets

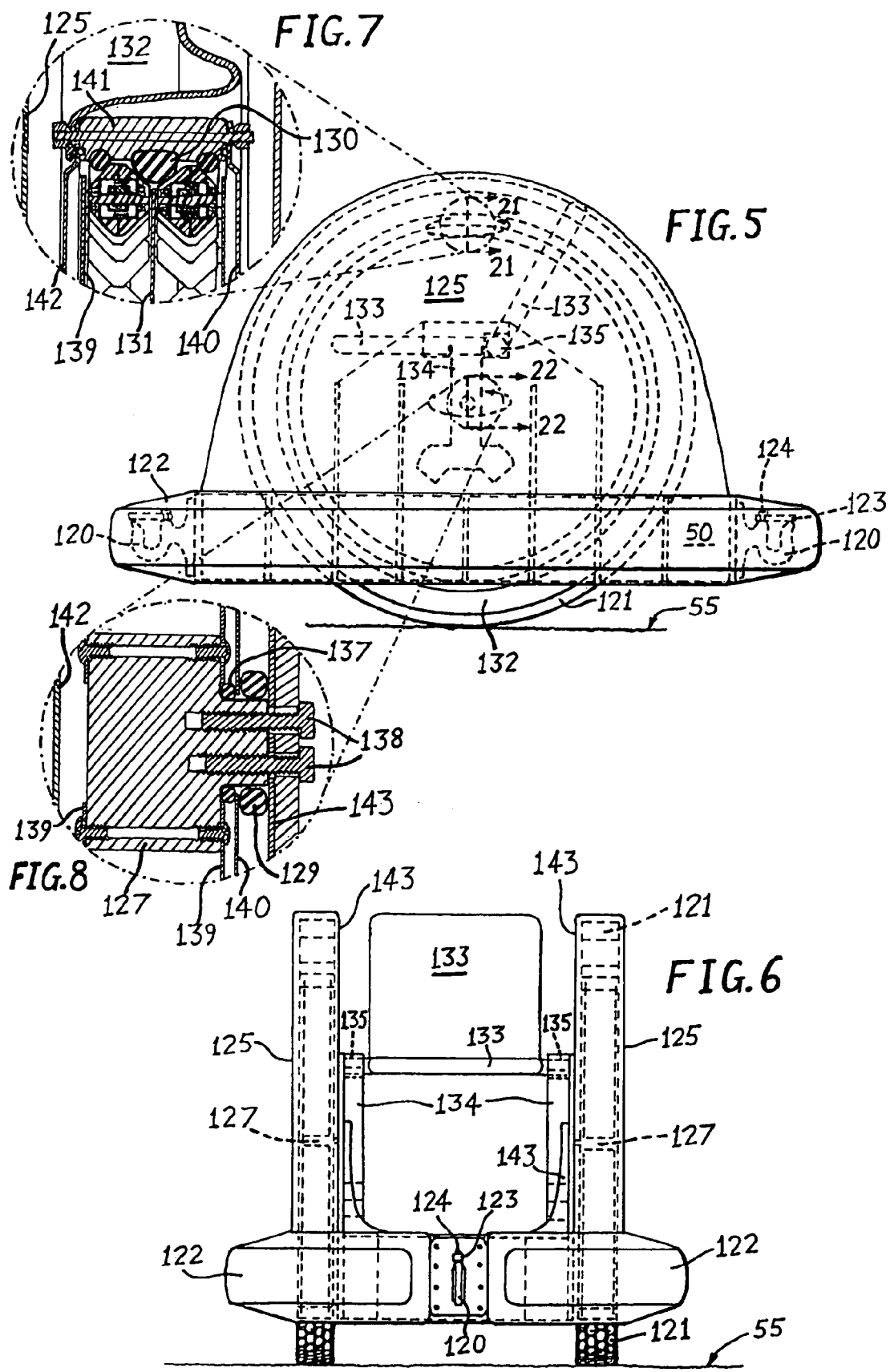

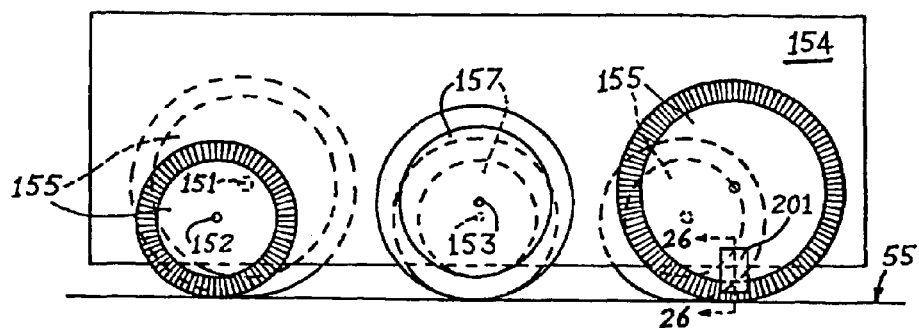
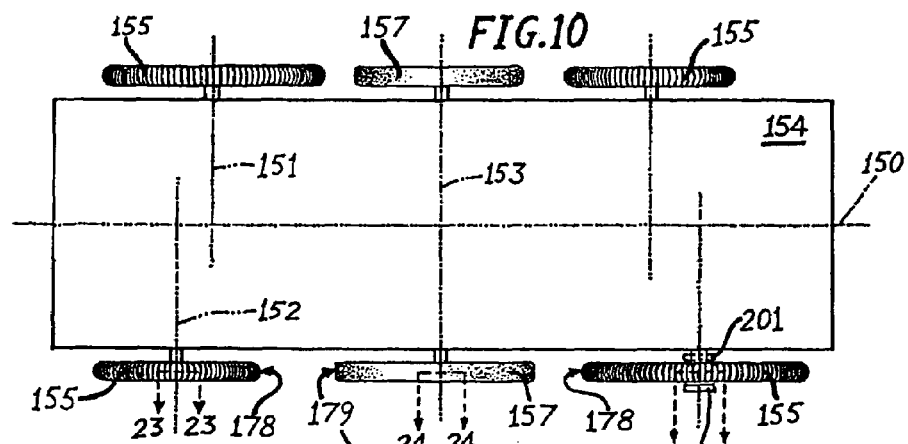
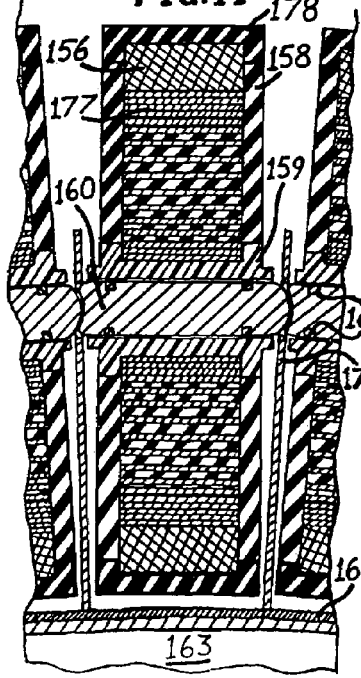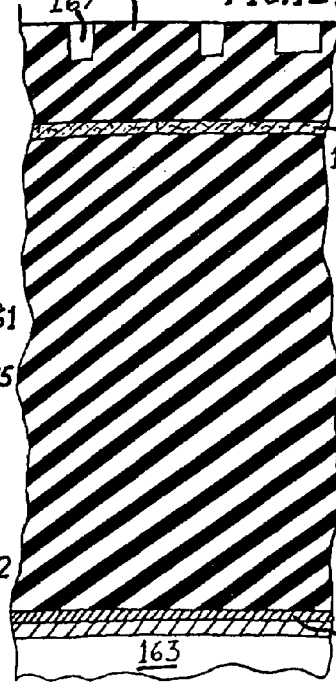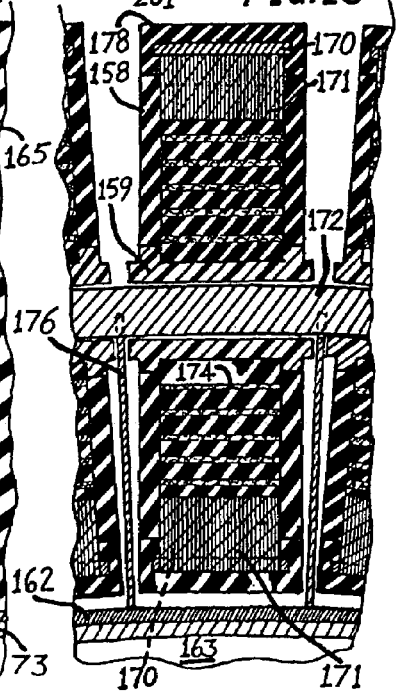

MULTIPURPOSE MOTOR VEHICLE WITH TWO COAXIAL PARALLEL WHEELS AND MORE ELECTROMAGNETIC HOLONOMIC WHEELS IN TANDEM

CROSS-REFERENCE TO RELATED APPLICATIONS

Present application is a continuation in part of U.S. patent application Ser. No. 09/781,090 filed on Jan. 12, 2001, now U.S. Pat. No. 7,017,696. The matter disclosed in the present application formed the amendment to application Ser. No. 09/781,090, received by the United States Patent and Trademark Office on Sep. 1, 2004.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention is directed to the field of electrical motor vehicles with zero turning radius. It also relates to those vehicular designs in which steering of the vehicle is not done by moving the axles of the wheels.

There had been designs in the past, which utilized an electric motor inside the wheel. On many occasions the wheel is turned into a wheel motor (U.S. Pat. No. 5,894,902). But as there are no gears in the case of a direct-driven wheel motor, in order to generate a high torque, either the diameter or the thickness of the wheel motor has to be increased: This makes the wheel motor heavy. To hold together wheels with wheel motors, the axles and the chassis (or the shell) both have to be stronger and heavier than in a vehicle driven by a centrally located power pack.

How to do away with the numerous mechanical parts, which weigh down an electric motor vehicle? Moreover, how to reduce the rolling friction to reduce the cruising power requirement of an electric motor vehicle? These were the two major pointers leading to this invention. U.S. Pat. Nos. 4,163,567 and 4,192,395 disclose vehicles, which opened a way to finding suitable answers. The rigid coaxial nature of the two parallel wheels in those vehicles restricts the use of the vehicles to low traveling speeds. Further, the electrical drive motors for the two wheels are located outside the wheel hubs, which limits the number of motors used to drive each wheel without sacrificing useful windscreen width of the vehicles. The bearings of the annular wheels have no provisions to protect against foreign materials from getting into their engaging surfaces. The use of very large wheels does not eliminate other driving mechanisms outside the wheels, excepting a separate steering mechanism. The rigidity of the mounting of annular wheels on vehicle frame does not take into account, momentary radial impacts on the wheels while rotating as the vehicle travels. These impacts bring about point distortions in the wheel, increasing the friction in the rotation of the wheels.

On factory shop floors, there is a need for simple, low-maintenance traction vehicles of high maneuverability. A two-wheel design improves the negotiability of such a traction vehicle, if necessary features are built into existing art. The most important sought-after feature is to eliminate the need to reverse the vehicle to effect traction. Universal platforms or holonomic wheels are capable of smooth front-rear interchangeability; but they all have more complex tire structures, and have to be necessarily of more than two wheels (U.S. Pat. No. 4,715,460).

The construction of a two-parallel-wheeled vehicle is restricted by the maximum diameter a practical annular wheel can reach without sacrificing structural strength. For to have more carrying ability or to have more space in a vehicle with no conventional steering or driving mechanism, holonomic wheels are promising. U.S. Pat. Nos. 4,335,899, 4,598,782, 4,715,460, 5,246,238, 5,312,165 and 6,547,340 disclose evolving designs in holonomic wheel design. Except in U.S. Pat. No. 6,547,340, rest of the designs fail to compensate for the uneven wear in the rollers in case of rectilinear motion by the vehicle having such wheels. However, in U.S. Pat. No. 6,547,340, there is no control over the necessary rotation of each roller after it leaves ground contact as the holonomic wheel rotates and the vehicle travels. Further, the scheme of positioning of rollers in a four-wheeled vehicle (U.S. Pat. No. 4,598,782) always generates forces which are not in the direction of actual travel of the vehicle. These forces are also cancelled by the unique positioning. However, not before they have exerted bending stresses on each of the axles of the holonomic wheels. In addition, the workings of the design also depend upon the uniformity of the ground friction each of the wheels experiences. Nonuniform ground friction has to be compensated for by varying wheel rotation in response, as there is no direct control over the rollers on the holonomic wheels of existing art.

BRIEF SUMMARY OF THE INVENTION

This invention solves the earlier problems by first increasing the diameter of wheels. In the first version, the wheels, two in number, get integrated with the shell of the vehicle, dispensing with the solid axle of existing electrical vehicles. The shell of this electric motor vehicle is basically in the form of a modified cylinder with crush zones added on the front and the rear of the vehicle, a portion of the cylindrical side of which faces the surface on which the vehicle travels; both ends of the modified cylinder remain vertical, and these two ends also act as openings with partial or full doors. The two wheels in annular form are mounted on the two ends, with the use of toroidal pneumatic flexible mounts. These mounts allow axle formations to deflect in sympathy with radial deflections happening due to impacting forces acting on the tires; and the flexible mounts absorb the deflections, preventing them from distorting the wheels or the axle formations. The modified cylindrical shell of the vehicle thus acts as the axle formation for both the wheels. The electrical energy storage devices are kept near that surface of the shell the other side of which always faces the ground; the positioning of the electrical energy storage devices makes the center of gravity of the vehicle low and lends stability to the design—this is possible, because all the electrical energy accumulators and superconductor assemblies are heavy. Numerous lightweight brush-less dc motors housed in biconic rotors circumferentially locate rotatably the inner annular surface of both the wheels. Both the wheels are driven by individual switching regulators powering the BLDC motors, also effecting regenerative braking when needed. Steering is accomplished by differential rotation of the respective wheels.

Thus, this invention avoids the use of gears, a mechanical steering, suspensions and pneumatic tires; it has a much greater torque-generation capability compared to motor-wheel designs. The rolling coefficient of friction is low, because the chord-versus-the-wheel-circumference ratio is low due to the increased effective diameter of the wheel.

The second version of the present invention forms a traction vehicular arrangement. In this form, by adjusting the height of the passenger seat to a low it can be turned into a vehicle similar to the version described hereinabove. Otherwise, the traction vehicular arrangement functions in conjunction with wheeled trailers. It is equipped with a hook on the front and the rear. The passenger seat can be rotated vertically to make the occupant of the seat sit facing the opposite side. This effectively makes this vehicle with an interchangeable front and rear. Both ends of the modified cylinder in this version of the present invention are not used as doors; rather, they are blocked by the annular laminar extension of the hub of the wheels nearly reaching the central axis. This way the entry of foreign material can be blocked completely from entering the bearing and driving mechanisms of the wheels.

The third version of the present invention makes use of holonomic large wheels arranged in tandem with the basic configuration described hereinbefore. Rollers are arranged uniformly on the rim of each holonomic wheel, with their axes perpendicular to the main axis of each holonomic wheel. Each roller has electromagnetic elements to make them function as rotors to an externally placed set of stators of a permanent magnet ac motor or induction motor. Fundamental traction and sideways stability of the vehicle is provided by the two large simple wheels which are centrally located side by side. Rest of the tandemly placed holonomic wheels provide horizontal stability to the vehicle, and also provide extra traction by the powered rotation of the individual wheels and steering guidance by the powered rotation of the rollers with electromagnetic elements induced by the stators which are linked to the chassis of the vehicle, when the rollers are in ground contact. A semi-helix magnetic or electromagnetic element in close proximity of the holonomic wheel tire constituted by the electromagnetic rollers, and fixed to the chassis, impart a rotatory force on passing electromagnetic rollers to angularly displace them to avoid their getting into ground contact repeatedly at fixed places on their external cylindrical surfaces, even when the vehicle is following a perfectly rectilinear path.

Accordingly, a principle object of the present invention is to simplify the construction of small electric motor vehicle.

It is another object of the invention that the bearing and the electrical drive mechanism are integrated.

It is a further object of the invention to devise a traction vehicular arrangement with high negotiability and without any mechanical steering whatsoever, to effect remote control driving of the traction vehicular arrangement.

Another object of the invention is to develop a large-diameter holonomic wheel with powered rollers forming the tire to have active control while steering and to avoid bending forces on the wheel axle generated by the travel of the vehicle on which the holonomic wheel is fixed.

An additional object of the invention is to devise a large vehicle augmenting the reliability of the concept of two parallel wheels put side by side, forming a vehicle with an addition of holonomic wheels with powered rollers forming the tire.

The characteristic features of the invention are set forth, in particular, in the appended claims; however, the following description in detail in context to the drawings facilitates a greater understanding of the unique concepts which this invention embodies. But this should be taken as illustrative, rather than restricting the scope of the ideas set forth in the section of claims. The principles and features of this invention may be utilized in applications outwardly dissimilar but in essence not departing from the scope of this invention.

BRIEF DESCRIPTION OF THE SEVERAL VIEWS OF THE DRAWINGS

FIG. 5 is a general side view of the second version of present invention with two parallel wheels, to function as a traction vehicle.

FIG. 6 is a general front view of the second version of present invention with two parallel wheels, to function as a traction vehicle.

FIG. 7 is an enlarged cross-sectional view taken along line 21-21 in FIG. 5, limited by a "dot-dash" circle drawn around line 21-21 and rotated 90 degrees around line 21-21 towards the semi-circular arrow encircling the "dot-dash" circle, to show general details of the bearing and driving mechanisms of the hubs of the two parallel wheels in FIG. 5.

FIG. 8 is an enlarged cross-sectional view taken along line 22-22 in FIG. 5, limited by a "dot-dash" circle drawn around line 22-22 and rotated 90 degrees around line 22-22 towards the semi-circular arrow encircling the "dot-dash" circle, to show details of mounting of the axles of the two parallel wheels on the chassis in FIG. 5.

FIG. 9 is a schematic side view of the third version of present invention using electromagnetic holonomic wheels in tandem with two parallel wheels.

FIG. 10 is a schematic plan view of the third version of present invention using electromagnetic holonomic wheels in tandem with two parallel wheels.

FIG. 11 is an enlarged cross-sectional view taken along line 23-23 in FIG. 10 to show only the details of one roller element with permanent magnets, of the electromagnetic holonomic wheel with a discontinuous toroidal tire.

FIG. 12 is an enlarged cross-sectional view taken along line 24-24 in FIG. 10 to show the general details of a tire of continuous construction.

FIG. 13 is an enlarged cross-sectional view taken along line 25-25 in FIG. 10 to show only the details of one roller element with squirrel-cage rotor formation, of the electromagnetic holonomic wheel with a discontinuous toroidal tire.

DETAILED DESCRIPTION OF THE INVENTION

Figure 1:
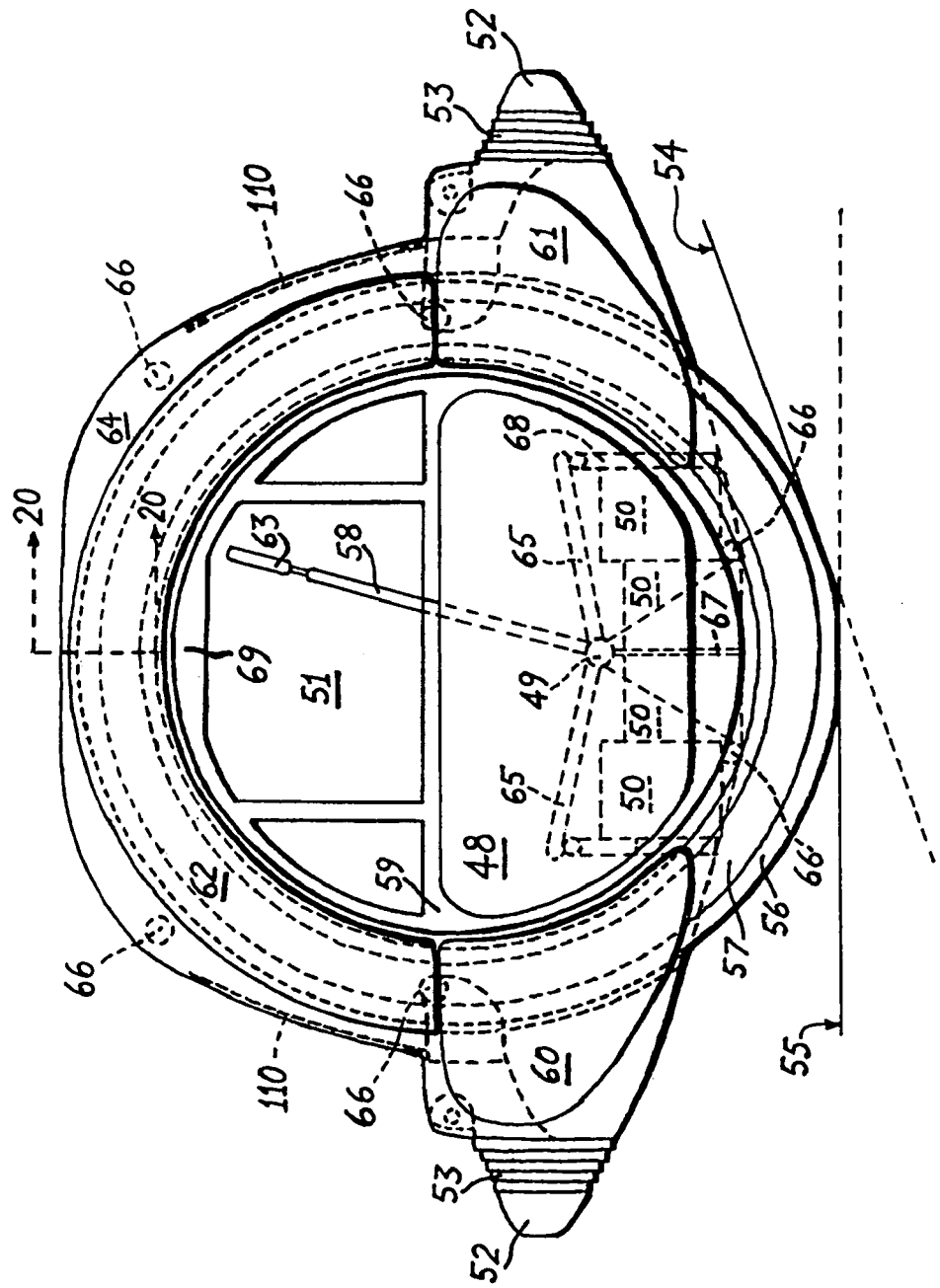
FIG. 1 is a side view of a two-wheel electric motor vehicle in accordance with the first version of present invention where there are just two wheels parallel to each other. The wheels are shown resting on level ground, as well as a plane with 20 degrees incline.
Figure 2:
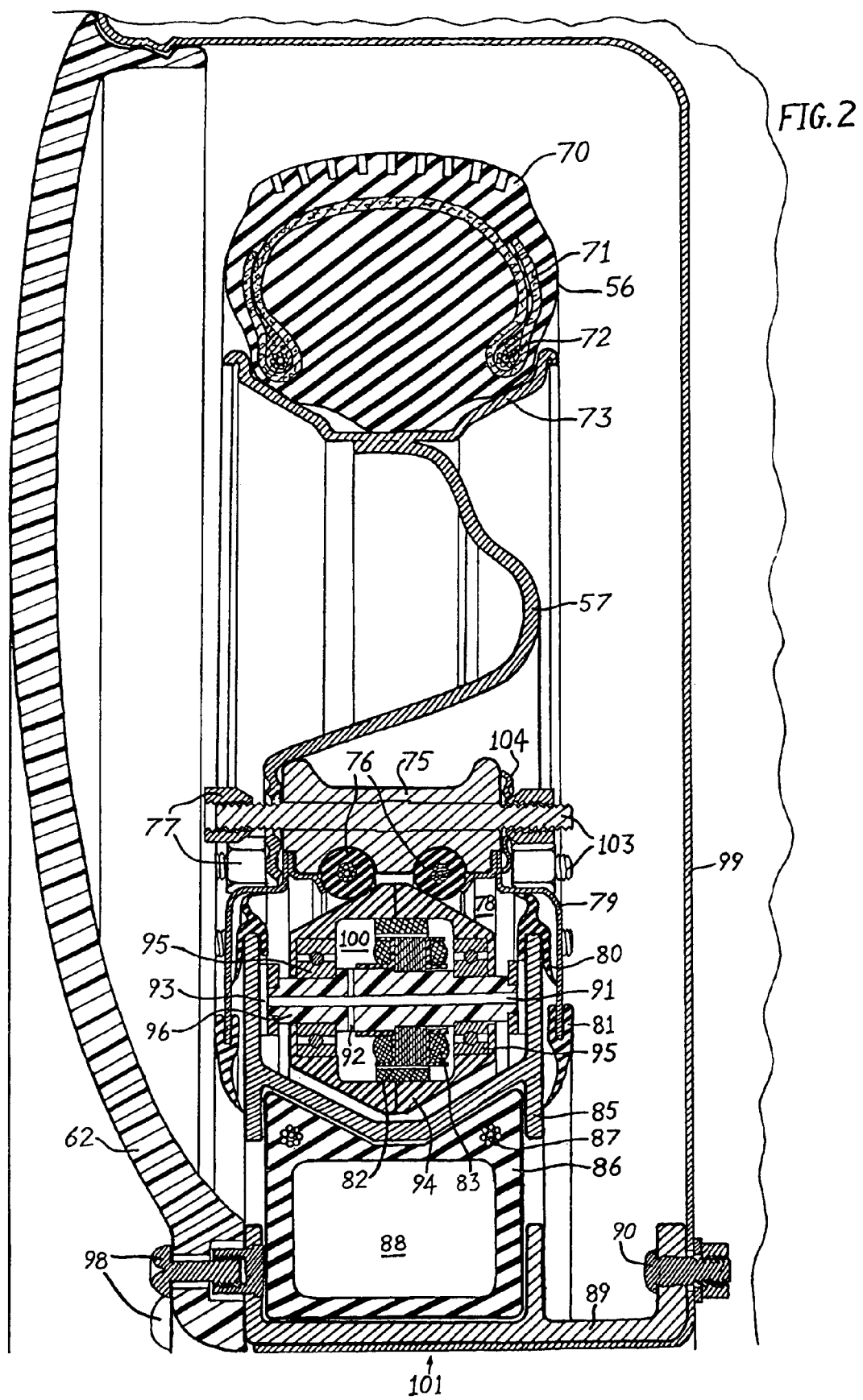
FIG. 2 is the leading part of an enlarged cross-sectional view taken along line 20-20 in FIG. 1 to show details of the annular wheel of the first version of present invention.
Figure 3:
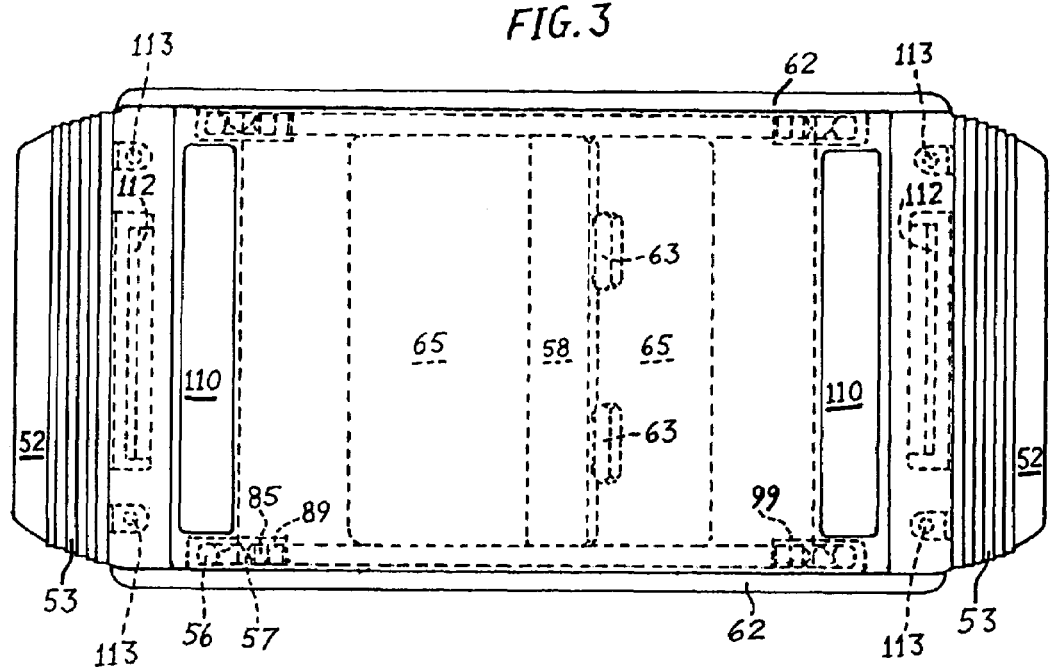
FIG. 3 is a general plan view of the first version of the present invention where there are just two wheels parallel to each other.
Figure 4:
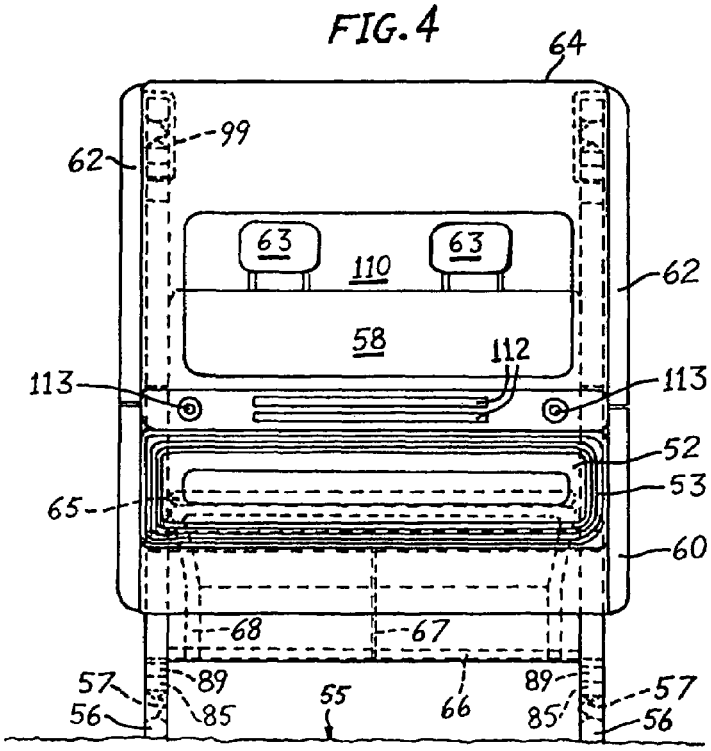
FIG. 4 is a general front view of the first version of present invention where there are just two wheels parallel to each other.

The first version of the present invention is described in detail with the aid of FIG. 1 through FIG. 4. The total height of the vehicle in FIG. 1 is nearly 1370 mm. In this present form, it is designed to accommodate two persons with some luggage space at the back. The seats are marked 65 in FIG. 1, FIG. 3 and FIG. 4. Batteries 50 in FIG. 1 are placed below seats 65. There is a provision to keep eight 100AH 12V lead acid batteries. The total weight of the batteries is approximately 240 kg. The position of batteries 50 keep the center of gravity of the vehicle very low; this, coupled with the eccentric loading on the vehicle, provides stability to the vehicle, in spite of its having only two parallel wheels. The top and front sides of the battery enclosure have to be strong and fully linked with the structure of the shell and, at the extremities, with the direct-drive rim motors: So that, in case of an accidental collision, the batteries 50 do not damage the legs of the occupants of seats 65 (FIG. 1, FIG. 3 and FIG. 4). The linking of the two ends of the shell with the body elements 66 and battery enclosure elements 67 and 68 (FIG. 1 and FIG. 4) increases the overall strength of the vehicle shell 64 (FIG. 1 and FIG. 4).

Backrest 58 (FIG. 1, FIG. 3 and FIG. 4) of seats 65 can be adjusted angularly around reclining axis center 49 to obtain different reclining angles. In FIG. 1, FIG. 3 and FIG. 4, the areas marked 52, on the front and rear both, indicate lightweight plastic bumpers. In case of a collision, to avoid the shock getting transferred on to the wheels and distorting them and to protect the passengers, plastic bumpers 52 and ridged crush-zone elements 53 (FIG. 1, FIG. 3 and FIG. 4) absorb most of the kinetic energy of the impact by collapsing. The tires are large in diameter (nearly 1575 mm), but are narrow (65 mm). Doors 59 (FIG. 1) on both the sides of the vehicle are hinged underneath point 69 (FIG. 1) to wheel casing 99 (FIG. 2) on surface 101 (FIG. 2). The possible sliding glass portions of the window is marked 51 in FIG. 1.

Windscreens 110 (FIGS. 3 and 4) are glued to vehicle shell 64 (FIG. 1 and FIG. 4). Headlamps 112 (FIG. 3 and FIG. 4) are placed just above ridged crush-zone elements 53. In order to conserve power, use is made of two 20 W fluorescent tubes for headlamps 112 driven by high frequency drivers. The right and left turn indicators are marked 113 in FIG. 3 and FIG. 4. The two fluorescent tubes with suitable cylindrical reflectors produce high and low beams; lenses in the path of light help to further focus the light beam.

There are two separate switching regulators for each multitude of brush-less dc motors rotatably locating annular wheel drum 75 (FIG. 2) by engaging with two parallel O rings 16 (FIG. 2). Rotor 94 (FIG. 2) is of truncated biconic form. Stator 96 (FIG. 2) is fixed in the toroidally formed channel 85 as shown in FIG. 2. Toroidally formed channel 85 is secured to vehicle shell 64 (FIG. 1 and FIG. 4) with the use of toroidal cushion 86 with pneumatic cavity 88 and steel cords 87 (all in FIG. 2). Toroidal cushion 86 is made of elastomeric material and grips double-flanged member 89 (FIG. 2). Double-flanged member 89 on its internal flanged flat side is bolted (90 in FIG. 2) to wheel casing 99, while, from the outside, wheel protector baffle 62 is mounted on to it with screws 98 (FIG. 2). Wheel protector baffle 62 (FIG. 1, FIG. 2, FIG. 3 and FIG. 4) is injection molded with a thermoplastic. Elements 60 and 61 (FIG. 1) also are modified wheel protector baffles doubling up as side bumpers. Similarly, element 48 (FIG. 1) is an injection-molded bumper to protect door 59 (FIG. 1). Electrical conductors to each BLDC motor enter stator 96 sideways from slot 93 to travel through coaxial tubular cavity 91 to reach stator windings 83, via radial holes 92, after switched by electronics placed in cavity 100. Multi-pole ring magnet 82 is made of rare earth elements. Each BLDC motor has two numbers of double-Z ball bearings 95 (all in FIG. 2). Annular wheel 57 has a solid rubber tire 56 (FIG. 1, FIG. 2, FIG. 3 and FIG. 4) secured on rim 73 (FIG. 2). Solid rubber tire 56 has a grooved tread 70, nylon fiber ply 71 and steel cords 72 (FIG. 2). Annular wheel 57 is held in place with multiple studs 103 and nuts 77 (FIG. 2). Ring 104 secures O-ring stopper 78 and dust protector 79 on the other side of the side annular wheel 57 is fixed on annular wheel drum 75. By altering the rpm of individual wheels, steering of the vehicle is achieved. Dynamic regenerative braking is also effected by the two switching regulators and is very effective, owing to the large diameter of the annular wheel 57 (FIG. 1). At the parting lines of annular wheel drum 75 and toroidally formed channel 85 (FIG. 2), to protect the bearing and driving mechanisms from dirt, there are thin annular rubber curtains 80 and 81 (FIG. 2), against which there is an optional positive air pressure from the inside of toroidally formed channel 85—worked up by small centrifugal fan pumps which suck filtered air from the inside of the vehicle and push it out through the leakage between the line of contact between annular rubber curtains 80, 81, and annular wheel drum 75 and toroidally formed channel 85, to prevent the entry of dust, dirt and water at low pressure heads.

In the case of the failure of the switching devices of one or both the switching regulators, there is a provision for two parallel stopping drives which otherwise work as regenerative brakes to first charge two capacitors from the regenerated braking power and then to step up the capacitor voltage with a switching converter and then to charge batteries 50 (FIG. 1). To act as parking brakes, there are four small dc motors with integral gears driving four threaded shafts which in turn move threaded sliders lined with braking material. Application of this braking arrangement involves the rotation of the geared dc motors in the positive direction in order to move the sliders towards the internal cylindrical surface of annular wheel drum 75 (FIG. 2) lying between the seats of two O rings 76 (FIG. 2). When the brake linings press against the wheel drum face, due to the enormous diameter of annular wheel drum 75, the braking effectiveness is good. In order to release this parking brake, the direction of motor rotations is reversed by electrically reversing the connections to the small dc motors. This braking is useful for parking, injecting a dc voltage in the brush-less dc motor windings to achieve electromagnetic braking would drain the batteries, and short-circuiting of BLDC motor windings only effects dynamic braking.

Steering, speed and braking are manually controlled by operating a wired or cordless manipulator; the driver may sit at any location in the vehicle. Ground clearance even on an incline of 20 degrees is adequately demonstrated with reference to surface 54 in FIG. 1 in comparison to level ground 55 (FIG. 1 and FIG. 4).

By making the driver sit in a more crouched manner, the diameter as well as the breadth of the vehicle could be reduced to produce a small vehicle, unlike the conventional bikes: A stable vehicle suitable for single occupancy, protecting the occupant from the vagaries of the weather.

The peculiarities of this electric vehicle design make it very stable in dynamic performance. While applying brakes, vehicle shell 64 (FIG. 1 and FIG. 4) tends to rotate with the wheels, but the heavy battery compartment keeps moving forward, thus canceling the likely swing of vehicle shell 64 anti-clockwise.

The batteries, even if replaced by fuel cells or superconductor assemblies, always have one common feature—weight. The weight of the electrical energy storage or generating units could not possibly be reduced in near future. In this first version of the present invention, concentration of weight lends itself remarkably well to the effective functioning of this electric motor vehicle.

Backrest 58 and head rests 63 (FIG. 1, FIG. 2 and FIG. 4) are padded equally on both front and rear sides, making it possible to sit inside the vehicle facing any of the two ends—conventional front or rear—and drive, as there are no mechanical linkages for driving this vehicle; and the manipulator could be operated from any location. Additionally, with backrest remaining vertical, passengers can occupy the whole of seats 65, accommodating two more passengers as a result.

The second version of the present invention is described in detail with the aid of FIG. 5 through FIG. 8. The outer diameter of traction tire 121 (FIG. 5 and FIG. 6) is nearly 1370 mm. Traction tire 121 is non-pneumatic and is fixed on traction wheel 132 (FIG. 5 and FIG. 7). Traction wheel 132 is bolted to traction wheel drum 141 (FIG. 7) in manner described hereinbefore and shown in FIG. 7. The bearing and driving mechanisms are common, and are shown in FIG. 7. It is essentially the same as described earlier and shown in detail in FIG. 2. There are only three modifications: (a) two numbers of BLDC motors are axially adjacent at one circumferential location, (b) toroidally formed channel 85 of FIG. 2 is replaced by floating ring 131 and axle ring 139 (FIG. 7); and (c) dust protector 79 in FIG. 2 is modified (element 140 in FIG. 7 and FIG. 8)) to radially extend near axle locator 127 (FIG. 6 and FIG. 8) at the center of traction wheel 132. Element 140 seals the internals of wheel bearing and driving mechanisms in conjunction with O rings 129 and 137 (FIG. 8). Four numbers of clamping bolts 138 (FIG. 8) secure axle locator 127 (FIG. 6 and FIG. 8) to chassis 143 (FIG. 5, FIG. 6 and FIG. 8). Dust protector baffle 142 (FIG. 7 and FIG. 8) is structurally similar to element 140 (FIG. 7 and FIG. 8) on its circumference and clamped underneath traction wheel 132 (FIG. 7) to traction wheel drum 141 (FIG. 7); dust protector baffle 142 remains centrally at a distance from axle locator 127 (FIG. 8). Semi-circular profiled O ring 130 is located in a groove medially on the inner annular surface of traction wheel drum 141 (FIG. 7). Semi-circular profiled O ring 130 (FIG. 7) functions as two numbers of O rings 76 (FIG. 2) as shown in FIG. 7. External wheel casing 125 (FIG. 5, FIG. 6 and FIG. 7) is immovably joined to chassis 143 (FIG. 6 and FIG. 8).

Batteries 50 (FIG. 5) are similar to the ones employed in the first version of the present invention. Batteries 50 are eight in number and are arranged in a single row on the base of chassis 143 (FIG. 5 and FIG. 6). The row of batteries 50 is protected by protective bumpers 122 (FIG. 5 and FIG. 6), which are made of metal or thermoplastic. The front and rear of the vehicle are identical in appearance. Both front and rear of the vehicle have a hook 120 with a locking link 123 held by a pin 124 (all in FIG. 5 and FIG. 6). Driver seat 133 (FIG. 5 and FIG. 6) is optional, as the vehicle can be driven by remote or programmed to follow fixed paths. In the absence of driver seat 133 the space above batteries 50 (FIG. 5) can be used for carrying goods. Positioning channels 134 (FIG. 5 and FIG. 6) serve to lift and lower driver seat 133 which gets located from rocking axis ends 135 (FIG. 5 and FIG. 6). Rocking axis ends 135 also locate driver seat 133 when it is tilted suitably to interchange the backrest with sitting space, to make the driver sit facing the other end of the vehicle. Lowering of driver seat 133 enables the vehicle to travel as a vehicle which is functionally similar to the first version of the present invention.

The third version of the present invention is detailed with the aid of FIG. 9 through FIG. 16. In FIG. 9, a vehicle is resting on level ground 55. Vehicle chassis 154 has six numbers of wheels of different diameters. Four of the wheels on the left side in FIG. 9 and FIG. 10 have their axes marked 151, 152, 153 and 153. Simple wheels 157 in FIG. 9 and FIG. 10 seem to have a common axis 153 which perpendicularly bisects longitudinal mesial line 150 in FIG. 10. Longitudinal mesial line 150 (FIG. 10) is an imaginary line drawn in FIG. 10 to indicate the locations of simple wheels 157 in a possible positional condition and electromagnetic holonomic wheels 155 (FIG. 9 and FIG. 10). If the length of this vehicle is extended by adding more wheels on both sides of axis 153 as marked in FIG. 10, the additional wheels have to be electromagnetic holonomic wheels 155. Electromagnetic stator unit 201 (FIG. 9, FIG. 10, FIG. 14, FIG. 15 and FIG. 16) generates a moving electromagnetic field which magnetically forces the rollers on electromagnetic holonomic wheel 155 to rotate or stall, depending upon the direction or nature of the electromagnetic field generated by electromagnetic stator unit 201.

The vehicle as depicted in FIG. 9 and FIG. 10 (in a possible positional condition) utilizes two parallel simple wheels 157 for main traction, steering, braking and sideways stability while traveling. Basic operation of two parallel simple wheels 157 (FIG. 9 and FIG. 10) is similar to the description of the operation of the first and second version of the present invention hereinbefore; however, the bearing and driving mechanisms can be different. Continuous construction of the solid tire of simple wheel 157 in FIG. 9 and FIG. 10 is shown in FIG. 12 in detail. Grooves 167 on tread 179 ensure road contact in wet conditions (FIG. 12) and ply 165 forms the skeleton of the tire (FIG. 12). Wheel 163 (FIG. 11, FIG. 12, FIG. 14 and FIG. 16) is of general construction. Rim 73 in FIG. 12 is generally similar to as detailed in FIG. 2. The base width and shape of rim 73 in FIG. 12 depends upon the thickness and construction of tire selected for simple wheels 157 (FIG. 9 and FIG. 10).

Figure 16:
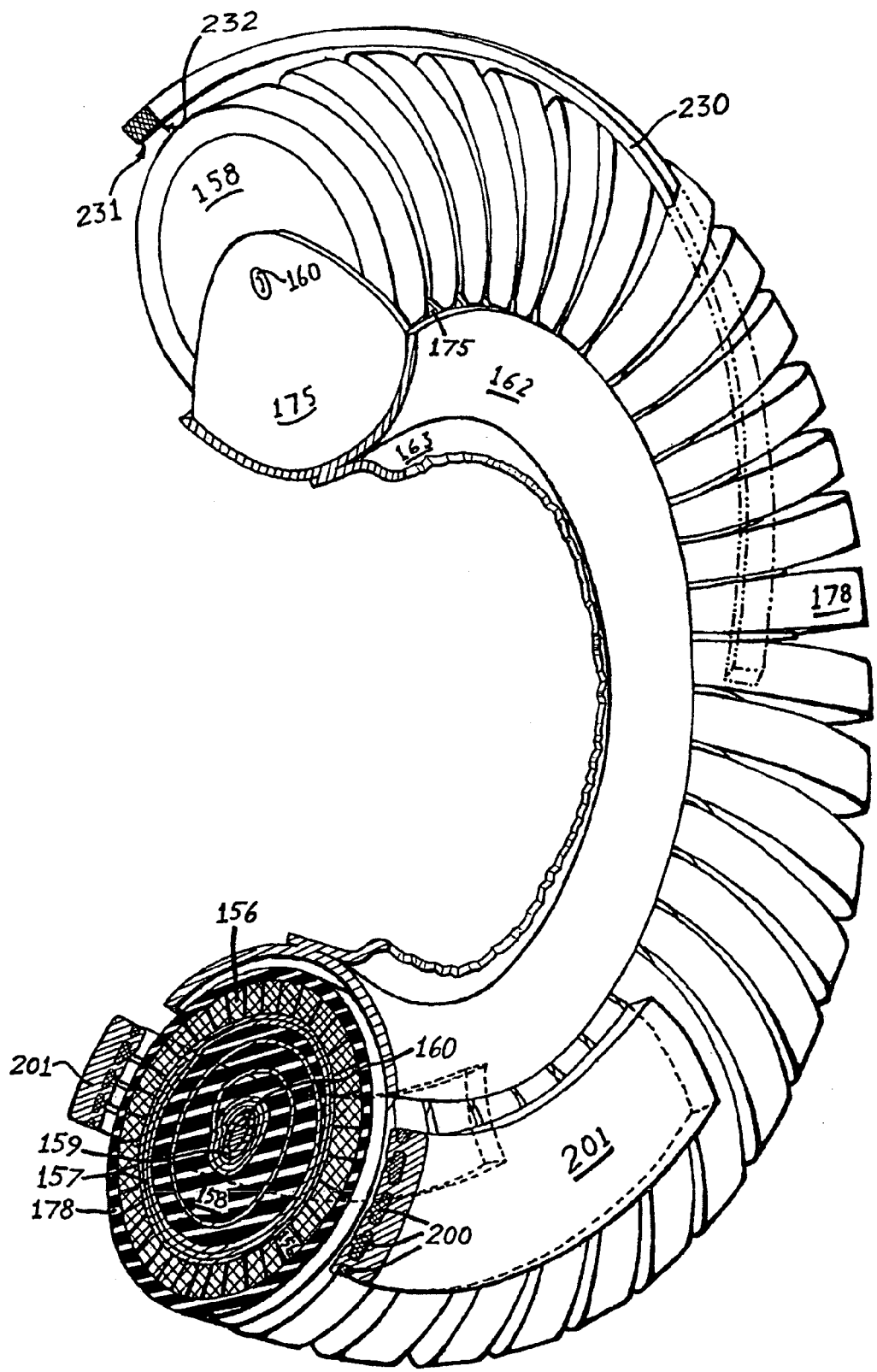
FIG. 16 is a schematic pictorial partial view of the electromagnetic holonomic wheel of present invention along with two integral radially cut-away views across the rim of the wheel to show details of the axial mount of an individual roller and some cross-sectional details of the inside of one roller element with permanent magnets forming a rotor along with dual stator formation.

The rollers on electromagnetic holonomic wheel of the present invention are internally of two possible types (a) magnetic and (b) electromagnetic. FIG. 11 shows the details of a multi-pole magnetic roller. Permanent magnet pole pieces 156 (FIG. 11) are fixed uniformly on the outer cylindrical side of an Archimedean spiral composed of a spring steel strip 177 (FIG. 11), which starts and ends shaped as small and large concentric right circular cylinders. The magnetic poles of permanent magnet pole pieces 156 (FIG. 11) alternate in direction with their alternate poles radially directed outwards. The Archimedean spiral composed of spring steel strip 177 (FIG. 11) has a variable lead which increases in the middle of the curve and becomes zero at the point of termination (shown in FIG. 11 and FIG. 16). The Archimedean spiral composed of spring steel strip, with permanent magnet pole pieces 156 fixed as described, is molded with an elastomeric medium 158 (FIG. 11); this whole unit in turn is fixed on a nylon bushing 159, and a rubber tread ring 178 (FIG. 10 and FIG. 11) cylindrically covers the external surface of this whole unit to form a magnetic roller ready to come into contact with level ground 55 (FIG. 9) after axle pin 160 (FIG. 11 and FIG. 16) is passed through nylon bushing 159 (FIG. 11) and axle pin 160 is fixed from both ends to brackets 175 (FIG. 11). Dual brackets 175 (FIG. 11 and FIG. 16) are equal in number to the number of magnetic rollers on electromagnetic holonomic wheel 155 (FIG. 10). Brackets 175 (FIG. 11) are uniformly joined to semi-circular base rim 162 (FIG. 11, FIG. 13, FIG. 14 and FIG. 16) to rotatably hold all the magnetic rollers from their axle pins 160 (FIG. 11 and FIG. 16). Axle pins 160 have sealing grooves which position sealing rings 161 (FIG. 11), in order to prevent foreign material from getting into the bearing formed by axle pin 160 and nylon bushing 159 (shown in FIG. 11). Every electromagnetic holonomic wheel of the present invention that employs axle pins 160 to rotatably hold electromagnetic rollers of either kind has to have one axle pin 160 of slightly modified construction, in which it has a threaded joint in the middle lengthwise. This joint makes the modified axle pin manually adjustable in length. This helps in the final fixing of all axle pins 160 (FIG. 11 and FIG. 16) together with the rollers on semi-circular base rim 162 (FIG. 11 and FIG. 16).

Figure 14:
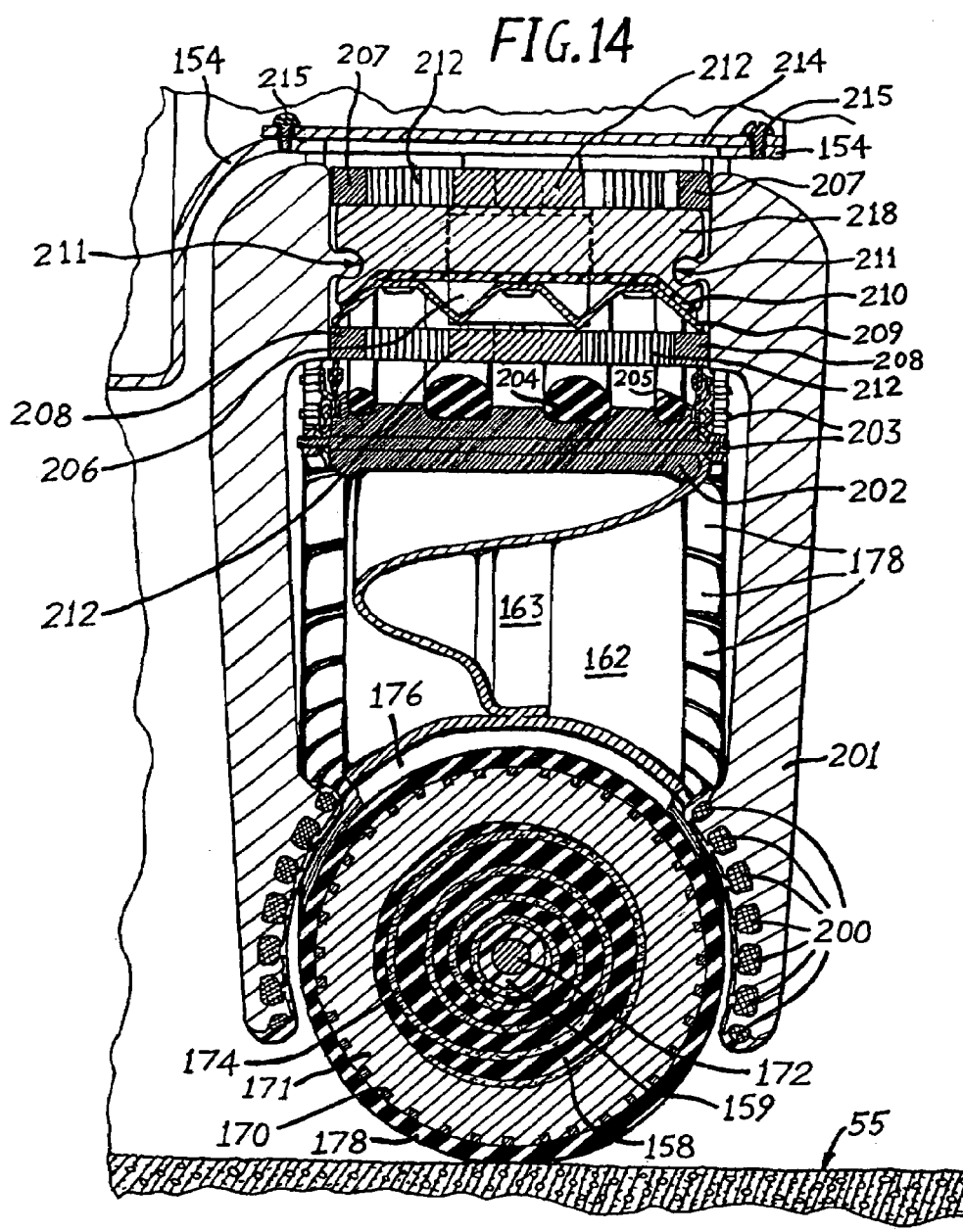
FIG. 14 is an enlarged cross-sectional view taken along line 26-26 in FIG. 9 to show the details of the bearing, driving, steering and braking mechanisms of the electromagnetic holonomic wheel with a discontinuous toroidal tire constituted of rollers with squirrel-cage rotor formation.

Electromagnetic rollers on electromagnetic holonomic wheel of the present invention are best described with the aid of FIG. 13 and FIG. 14. In FIG. 13, silicon steel stampings form squirrel cage-rotor stack on the cylindrical exterior of which are fixed aluminum squirrel-cage conductors 170 in angular uniformity. Fiber ply 174 (FIG. 13 and FIG. 14) is spirally interspersed in elastomeric medium 158 (FIG. 11, FIG. 13, FIG. 14 and FIG. 16). Elastomeric medium 158 cylindrically holds on the outside the assembly of squirrel-cage rotor stack 171 and aluminum squirrel-cage conductors 170, and internally grips nylon bushing 159 which is rotatably positioned by axle ring 172 (all best viewed in FIG. 13). Rubber tread ring (FIG. 13 and FIG. 11, as well as in FIG. 14 and FIG. 16) fits on the external cylindrical surface of squirrel-cage rotor stack 171. Spacer brackets 176 (FIG. 13 and FIG. 14) are similar to brackets 175 (FIG. 11 and FIG. 16), except for the fact that spacer brackets 176 are shorter in height compared to brackets 175 with the top half of the hole in brackets open to receive axle ring 172 which is almost full circle with just a missing part; this missing part is a small lock nut (not shown) which holds both ends of axle ring 172 together. The roller meant to be positioned after tightening of lock nut is made of two identical halves (not shown) that are screwed on to each other after positioned appropriately around axle ring 172 (FIG. 13). In FIG. 13 two circular grooves (not shown) can be cut on either ends in the bore of nylon bushing 159 to accommodate two rubber seals accomplishing the function of sealing rings 161 (FIG. 11).

Figure 15:
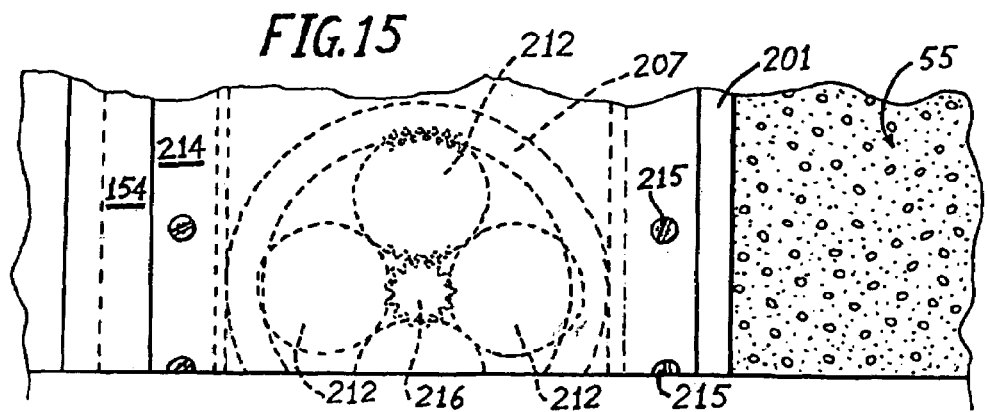
FIG. 15 is a plan view of FIG. 14 to show some details of steering, braking and stator positioning mechanism.

Electromagnetic stator units 201 (FIG. 9, FIG. 10, FIG. 14, FIG. 15 and FIG. 16) are essential for effective operation of the holonomic wheel of the present invention, by exerting either a stalling force or a torque on each roller in ground contact and each roller approaching ground contact to respectively effect non-rotation or bidirectional rotation/rotations around minor axes formed by axle pins 160 or jointly by axle ring 172. The placement and orientation of electromagnetic stator unit 201 near the ground contact of electromagnetic holonomic wheel 155 below either side of semi-circular base rim 162 is shown in FIG. 16, while one possible version of the placement of electromagnetic stator unit 201 is shown in FIG. 14. and FIG. 15. Stator windings 200 (FIG. 14 and FIG. 16) are basically similar, in spite their being wound for different kind of electric motors; it is an induction motor in FIG. 14, while in FIG. 16 it is a permanent magnet ac motor. For having a small number of poles with higher torque generation ability it is necessary that the magnetic circuit between the left-hand side and right-hand side stator units 201 is joined using ferromagnetic members outside of the rotor elements positioned inside the rollers of the electromagnetic holonomic wheel of the present invention. This joining is done at semi-circular lock 211 (FIG. 14) involving silicon steel stampings stacked together forming stator link 218 (FIG. 14) and two numbers of electromagnetic stator units on either side of holonomic wheel drum 202 (FIG. 14). Semi-circular lock 211 (FIG. 14) allows a little angular freedom with reference to the geometrical center of concentric semi-circles of semi-circular lock 211. This angular freedom is essential for top cam disc 207 (FIG. 14 and FIG. 15) and bottom cam disc 208 (FIG. 14) to rotate appropriately urged by planetary gears 212 (FIG. 15) driven by geared dc motor 206 (FIG. 14) through pinion 216 (FIG. 15). Top cam disc 207 and bottom cam disc 208 to the naked eye look like perfectly circular discs; their diametrical deviation at different points of their circumference is less than a millimeter. They are assembled with reference to each other; and by their joint predetermined amount of rotation governed by an encoder built into geared dc motor 206 (FIG. 14) the physical proximity of both electromagnetic stator units 201 to rubber tread rings 178 (FIG. 14 and FIG. 16) is controlled in order to effect electromagnetic and mechanical braking of the electromagnetic rollers and electromagnetic holonomic wheel 155, and also to optimize the magnetizing current through stator windings 200 (FIG. 14 and FIG. 16): In rough driving conditions the physical proximity is decreased to avoid any possible mechanical friction between electromagnetic stator units 201 and rubber tread rings 178; conversely, on smooth roads the physical proximity has to increase in order to increase control over electromagnetic rollers to avoid veering off of the vehicle of the present invention due to insufficient surface friction and steering control. Wheel 163 (FIG. 14) is of general construction and described with reference to FIG. 2 and FIG. 7 hereinbefore. Holonomic wheel drum 202 (FIG. 14) is made of aluminum alloy to keep it light in weight. Bolts 203 locate wheel 163 (FIG. 14). Two each of O rings 204 and 205 are respectively similar to O rings 130 (FIG. 7) and 76 (FIG. 2) except for dimensional variations. Bearing and driving mechanisms are also similar to the ones shown in FIG. 2 and FIG. 7, except for increase in the number BLDC motors in the axial row by one. Toroidally formed channel 209 (FIG. 14) is also similar to toroidally formed channel 85 (FIG. 2) except for an extra axial inverted V- shaped cavity to accommodate the extra BLDC motor just described. Insulating spacer 210 (FIG. 14) is employed to stop wasteful eddy current generation into toroidally formed channel 209 (FIG. 14). Cover plate 214 (FIG. 14) is screwed on with screws 215 (FIG. 14 and FIG. 15) to vehicle chassis 154 (FIG. 9, FIG. 10 and FIG. 14) on the opening above top cam disc 207 (FIG. 14 and FIG. 15).

In FIG. 16 twisted magnetic strip 230 (lengthwise in the form of less than half a length of one revolution of a helix) is connected to vehicle chassis 154 (FIG. 9 and FIG. 10) and has two magnet poles 231 and 232 (FIG. 16) all through uniformly facing rubber tread rings 178 (FIG. 16) on all the magnetic rollers in FIG. 16. As wheel 163 (FIG. 16) rotates around wheel axis, adjacent magnetic rollers line up in an orderly manner as opposing magnetic poles located in adjacent magnetic rollers pull close. When no steering taking place and the vehicle traveling in a straight line on level ground 55 (FIG. 9 and FIG. 10), the magnetic rollers in FIG. 16 do not rotate around their respective axis (two such axes are shown as axle pins 160 in FIG. 16); in this condition the magnetic field produced by twisted magnetic strip 230 (FIG. 16) imparts a rotating magnetic field on permanent magnetic pole pieces 156 (FIG. 11 and FIG. 16), which urges the magnetic rollers to displace angularly around their respective axes, axle pins 160. The electromagnetic rollers depicted in FIG. 13 and FIG. 14 will also displace in the same manner when subject to the rotating magnetic field just described.

Magnetic or electromagnetic sensor means are fixed angularly in line but at a distance from the symmetrical ends (one of the ends showing stator windings 200 in FIG. 14 and FIG. 16) of electromagnetic stator units 201 (FIG. 14 and FIG. 16). The sensor means pick up signals from rotating rollers after they leave ground contact with the rotation of wheel 163 (FIG. 14 and FIG. 16) as the vehicle travels on level ground 55 (FIG. 14). These signals are useful in efficient steering control. In many traveling conditions, active rotation of the rollers by powering electromagnetic stator units 201 is not needed; just by differential rotation of two simple wheels 157 (FIG. 9 and FIG. 10) adequate steering is achieved. In those conditions signals from the sensor means just described are sampled and if found adequate, no power is supplied to electromagnetic stator units 201. The sensor means also sense insufficient rotation of the rollers and for a short duration the power to electromagnetic stator units 201 is increased.

An increase in the number of electromagnetic stator units 201 (FIG. 14 and FIG. 16) symmetrically on both sides of wheel 163 (FIG. 14 and FIG. 16) replicating the arrangement of electromagnetic stator units 201 in FIG. 16 in a circular row not only increases steering power to some extent; but it also helps in urging the main rotation of wheel 163 (FIG. 14 and FIG. 16) around its main axis, as different row-wise placed electromagnetic stator units 201 are sequentially powered, producing a circulating magnetic field in sympathy with the main rotation of wheel 163 (FIG. 14 and FIG. 16). Extra electromagnetic braking force is also developed using this arrangement.

Extra magnetic or electromagnetic sensors are fixed to vehicle chassis 154 (FIG. 9, FIG. 10 and FIG. 14), close to the rollers of electromagnetic holonomic wheel of the present invention. These sensors pick up signal corresponding to the main rotation of wheel 163 as well as the rotation of rollers on wheel 163 (FIG. 9, FIG. 10, FIG. 14 and FIG. 16). These sensors are of importance because they confirm the main rotation of wheel 163 in addition to the sensors described earlier, and they also sense the necessary constant angular displacement of the rollers on wheel 163 under the magnetic influence of twisted magnetic strip 230 (FIG. 16) and/or electromagnetic stator units 201 (FIG. 14 and FIG. 16).

The rollers in FIG. 11 can be made lighter by using multi-pole plastic-magnet rings instead of permanent magnet pole pieces 156. Only rubber tread rings need be replaced after wear. The rollers in FIG. 13 can be designed to function without rubber tread rings 178. For this purpose, aluminum squirrel-cage conductors 170 have to be of hardened aluminum alloy, and squirrel-cage rotor stack 171 has to be made of hard silicon-steel stampings (FIG. 13 and FIG. 14). Special purpose vehicles can be made using such rollers.

What is claimed is:

1. A vehicle, comprising:
   a plurality of different or identical wheels positioned symmetrically or asymmetrically in tandem on both the sides of an imaginary longitudinal mesial line running along the direction of the general rectilinear travel by said vehicle, wherein each of said wheels is vertically positioned with respective axes of said wheels generally perpendicularly intersected by said imaginary longitudinal mesial line in a plan view of said vehicle and said plurality of different or identical wheels is collectively rotatably positioned by
   a vehicle chassis spanning distances between said wheels and extending beyond the radial boundaries of said plurality of different or identical wheels, on the front, rear and top of said vehicle; and
   each wheel of said wheels, comprising
      either a tire of continuous annular construction, made of any elastomeric medium, forming each of the outer peripheries of a maximum of two said wheels in the possible positional condition of the respective axes of said two wheels generally perpendicularly bisecting said imaginary longitudinal mesial line in a plan view of said vehicle;
      or a non-pneumatic tire forming the outer periphery of each said wheel, in the positional condition where the axis of each said wheel generally perpendicularly intersects but does not bisect said imaginary longitudinal mesial line, and of holonomic construction consisting of a multitude of identical, generally right circular cylindrical rollers; said rollers made of any elastomeric medium and/or metal, with central hubs, rotatably held at respective said central hubs by the same multitude of axle pins unitedly forming a regular polygon fixed by the same multitude of uniformly interspersed radial brackets fixed basally to, axially along and around the outer circumference of the semi-circular base rim of each said wheel; wherein
         said multitude of identical, generally right circular cylindrical rollers are each rotatable from said respective central hub around a respective minor axis formed by the respective said axle pin held along both the circular sides of each said roller by two of said radial brackets, each said minor axis always perpendicular to the axis of rotation of each said wheel;
         each said roller from said multitude of identical, generally right circular cylindrical rollers, comprises
            (a) said central hub made of an industrial plastic and/or metal together with bearing means or a bushing,
            (b) magnetic poles or electromagnetic squirrel-cage means radially disposed with angular uniformity about said central hub, and
            (c) a hard or resilient tread ring radially disposed about said magnetic poles or electromagnetic squirrel-cage means, outwardly presenting a uniform, generally cylindrical surface, and said tread ring made of either any elastomeric medium, metal, or metals;
      and
      electromagnetic stator unit means arranged externally of each said wheel with said non-pneumatic tire of said holonomic construction, placed near the ground contact of said non-pneumatic tire of said holonomic construction below either side of said semi-circular base rim, to electromagnetically influence said magnetic poles or electromagnetic squirrel-cage means in each said roller to either exert either a stalling force or a torque on each said roller in ground contact and each said roller approaching ground contact to respectively effect non-rotation or bidirectional rotation/rotations around said minor axis of each said roller in ground contact and each said roller approaching ground contact, or to mechanically move close to varyingly approach or grip each said roller in ground contact to apply respective degrees of electromagnetic driving, or electromagnetic and mechanical braking both to said bidirectional rotation/rotations of each said roller and each said wheel with said non-pneumatic tire of said holonomic construction, and electromagnetic and/or mechanical braking to the rotatability of each said wheel with said non-pneumatic tire of said holonomic construction.

2. A vehicle in accordance with claim 1, wherein said magnetic poles are inside multi-pole plastic magnet rings inside said rollers.

3. A vehicle in accordance with claim 1, wherein magnetic or electromagnetic sensor means externally of each said wheel with said non-pneumatic tire of said holonomic construction, fixed angularly in line but at a distance from the symmetrical ends of said electromagnetic stator unit, pick up signals from rotating said rollers after said rollers leave ground contact with the rotation of said wheel with said tire of said holonomic construction; said signals from magnetic or electromagnetic sensor means determining increased or no power supply to said electromagnetic stator unit means.

4. A vehicle in accordance with claim 3, wherein extra magnetic or electromagnetic sensors, fixed to said vehicle chassis, close to said rollers, pick up signals corresponding to the main rotation of said wheel with said non-pneumatic tire of said holonomic construction, as well as the rotation of said rollers on said wheel with said non-pneumatic tire of said holonomic construction; and said extra magnetic or electromagnetic sensors confirm the main rotation of said wheel with said non-pneumatic tire of said holonomic construction and also sense the necessary constant angular displacement of said rollers on said wheel with said non-pneumatic tire of said holonomic construction under the magnetic influence of said twisted magnetic strip and/or said electromagnetic stator units.

5. A vehicle in accordance with claim 1, wherein a twisted magnetic strip, lengthwise in the form of less than half a length of one revolution of a helix, is connected to said vehicle chassis and has two magnet poles all through uniformly facing said rollers; the magnetic field produced by said twisted magnetic strip imparts a rotating magnetic field on either said magnetic poles or said electromagnetic squirrel-cage means during said bidirectional rotation/rotations of said wheel comprising said non-pneumatic tire of said holonomic construction, which urges said rollers to displace angularly around respective said minor axes.

* * * * *